Figure 3:
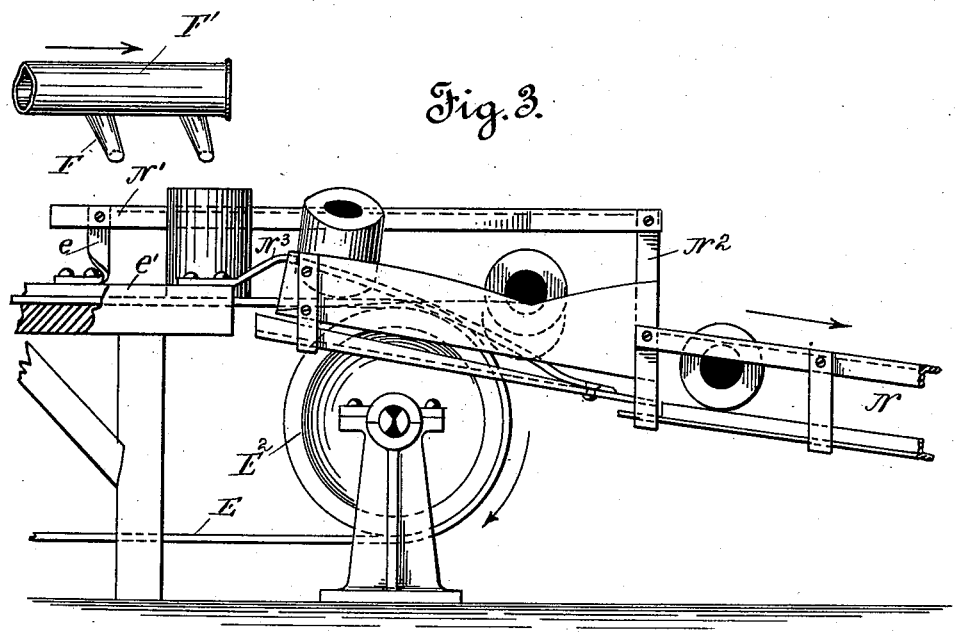

(No Model.) 3 Sheets—Sheet 1.
H. SCHAAKE.
CAN COOLING MACHINERY.
No. 564,163. Patented July 14, 1896.
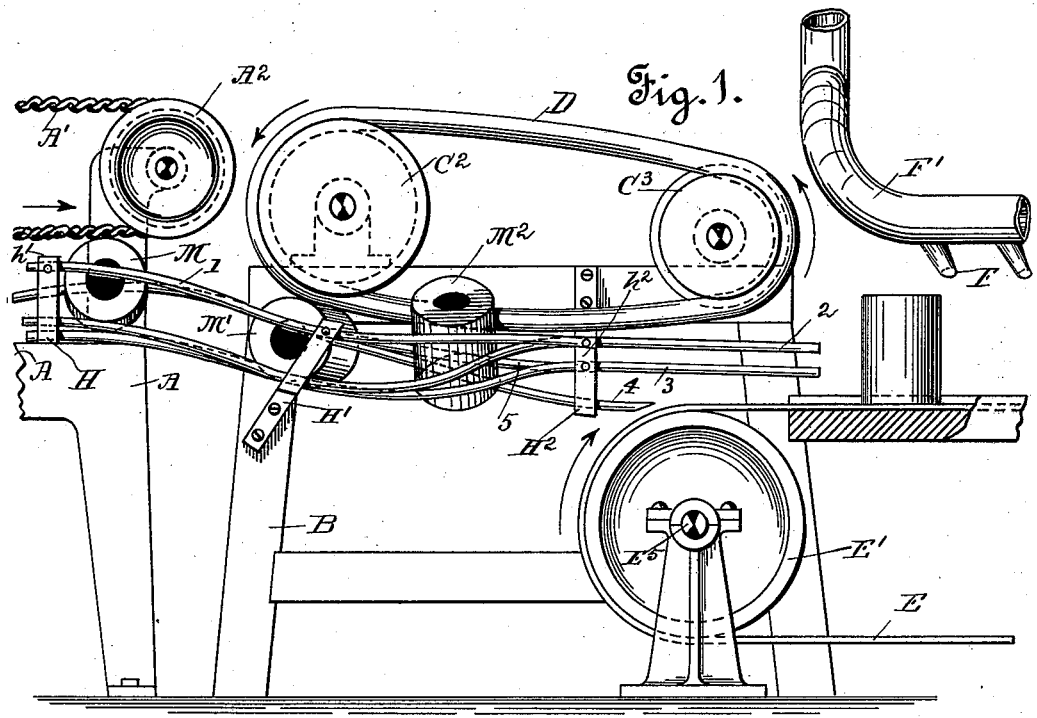
Fig. 1.
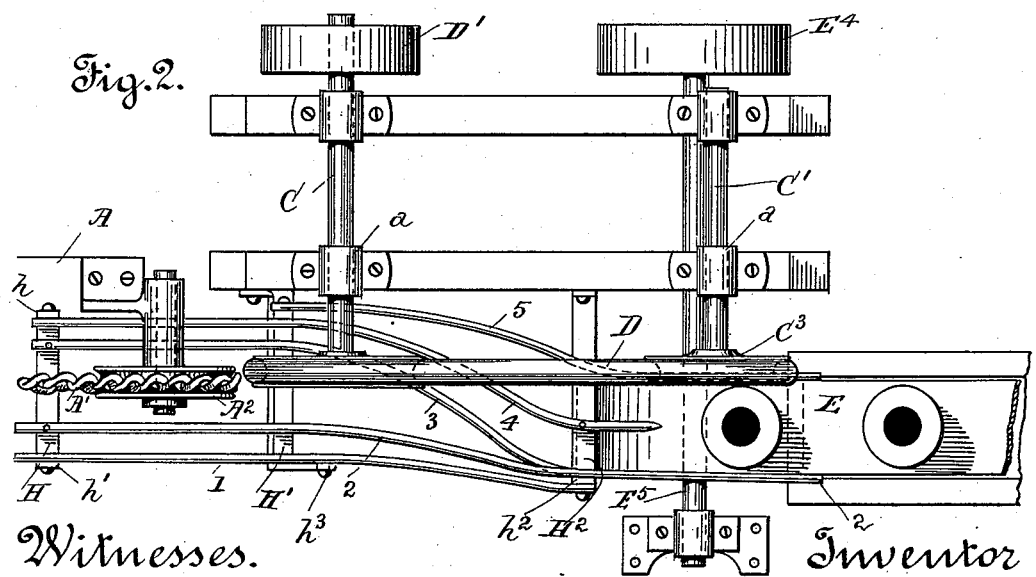
Fig. 2.
Witnesses.
Inventor
Henry Schaake,
by 
Atty.

(No Model.) 3 Sheets—Sheet 2.
H. SCHAAKE.
CAN COOLING MACHINERY.

No. 564,163. Patented July 14, 1896.

Witnesses.
J. E. Monteverde.
W. H. Cobb.

Inventor.
Henry Schaake.
by N. A. Acker
atty (No Model.) 3 Sheets—Sheet 3.

H. SCHAAKE.
CAN COOLING MACHINERY.

No. 564,163. Patented July 14, 1896.

Witnesses.
Inventor.
Henry Schaake

UNITED STATES PATENT OFFICE.

HENRY SCHAAKE, OF SAN FRANCISCO, CALIFORNIA.

CAN-COOLING MACHINERY.

SPECIFICATION forming part of Letters Patent No. 564,163, dated July 14, 1896.

Application filed December 18, 1893. Serial No. 493,999. (No model.)

*To all whom it may concern:*

Be it known that I, HENRY SCHAAKE, a citizen of the United States, residing at San Francisco, in the county of San Francisco and State of California, have invented certain new and useful Improvements in Can-Cooling Machinery; and I do hereby declare the following to be a full, clear, and exact description of said invention, such as will enable others skilled in the art to which it most nearly appertains to make, use, and practice the same.

This invention relates to certain new and useful improvements in can-cooling machinery, which consists in the arrangement of parts and details of construction, as will be hereinafter more fully set forth in the drawings, and described and pointed out in the specification.

The invention relates more particularly to that portion of the machine which receives the cans from the solder-bath while in a horizontal position, gradually turns or tilts the can until it is held in a vertical position, and places the can, while in a vertical position, upon an endless traveling belt, which carries the can through a blast of air in order to cool or solidify the solder.

It has been customary in many machines to run the cans from the solder-bath directly to the air-blast, without changing the position of the same. Consequently, as the solder is in a molten state, it runs from the can-body, hence causing the ends to be imperfectly secured to the body, or the solder runs and solidifies in lumps, which presents an unattractive can. Again the cans bearing against each other, as run from the solder-bath to the cooling-machine, causes the displacement of the solder unless separating-fingers be provided. While separating-fingers or similar devices will answer to maintain the can-bodies apart so as to prevent displacement of molten solder by reason of the cans bearing against each other, they will not obviate the running of the solder due to the cans being carried in a horizontal position.

By my device the solder is maintained evenly distributed, while being tilted or turned into a vertical position, by causing the can to be kept rotated, thus keeping the can from dragging or slipping, which would displace the molten solder.

I have discovered that by providing a device for upsetting or turning the cans from a horizontal to a vertical position and delivering the cans in this position to the conveying-belt, with the freshly-soldered end resting upon the belt which carries the cans exposed to the cooling air-blast, I not only prevent the running of the solder from the joint, but provide a much better joint after the solder has solidified, for the reason that the can-body being turned from a horizontal to a vertical position the molten solder is given an opportunity to flow between the can-head flange and the can-body.

In order to more fully comprehend my invention, reference must be had to the accompanying sheets of drawings, wherein—

Figure 4:
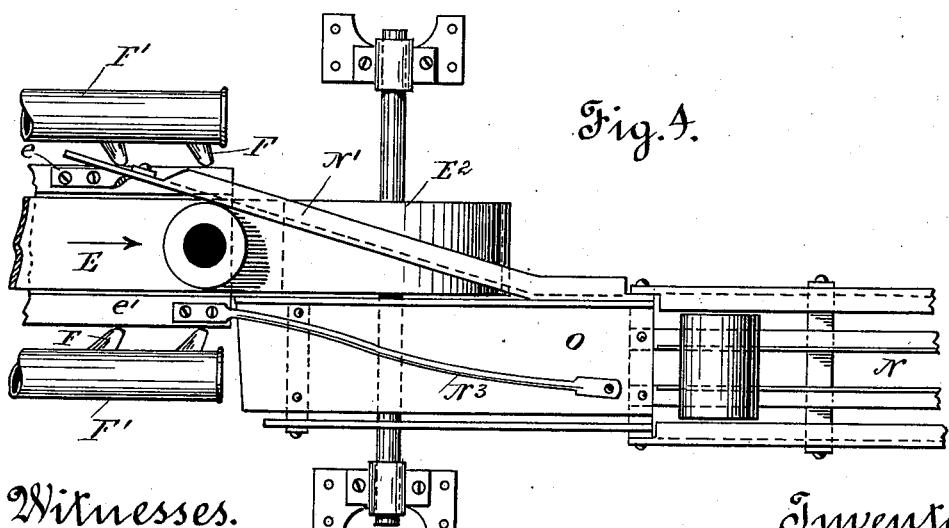
Figures 5, 6:
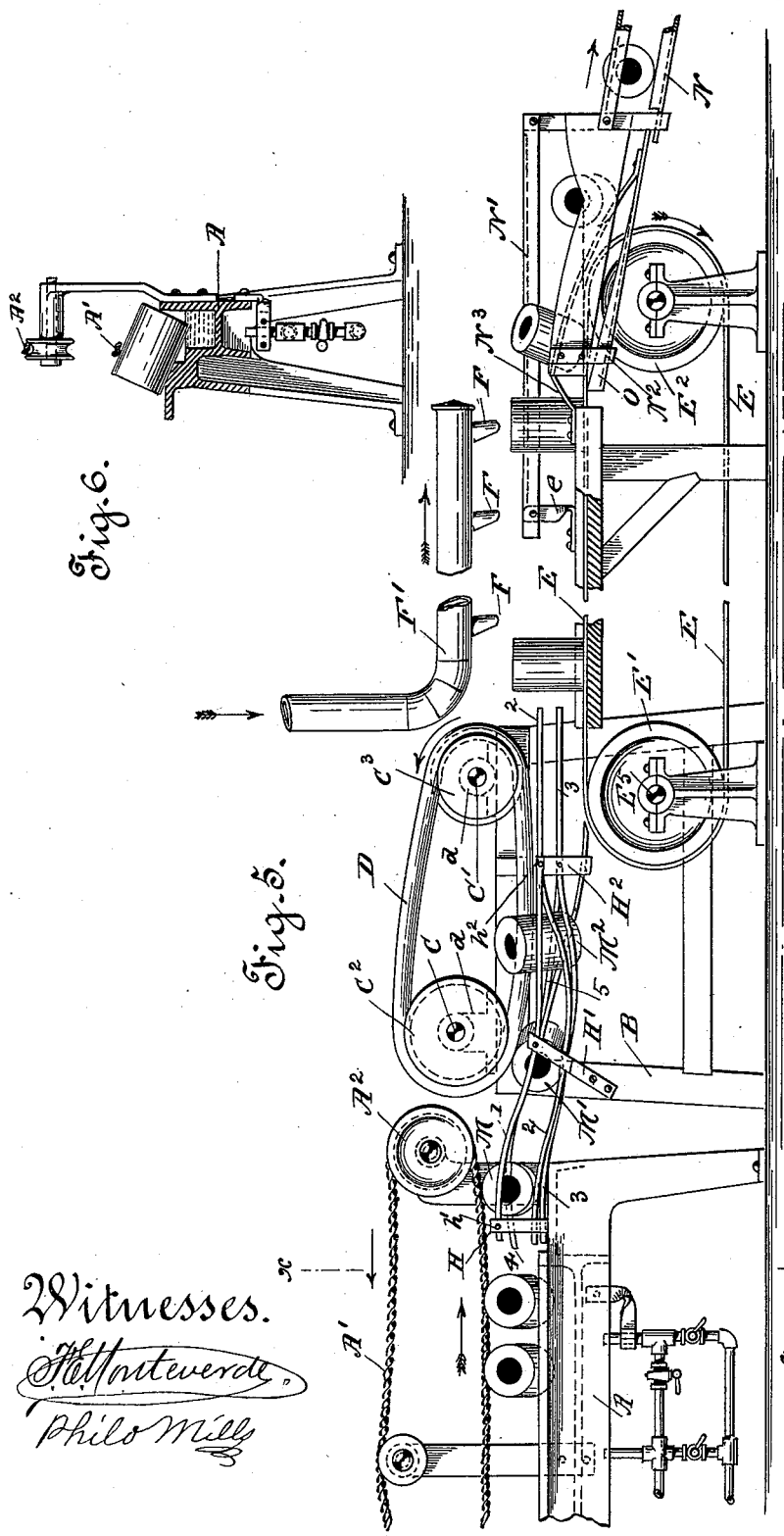

Figure 1 is a side elevation of that portion of the machine which receives the can-body from the solder-bath while in a horizontal position, gradually turns or tilts the same to a vertical one, and delivers the can to the conveyer-belt of the cooling-machine in such position, the solder-bath, conveyer-belt, and air-blast pipe being broken away. Fig. 2 is a top plan of Fig. 1. Fig. 3 is a side elevation showing the rear end of the machine, being a continuation of Fig. 1, showing the devices for throwing the can from a vertical to a horizontal position, so as to permit of the same entering a runway by means of which it may be conveyed to any convenient position or mechanism. Fig. 4 is a top plan of Fig. 3. Fig. 5 is a side view in elevation, partly broken away, showing one of the solder-baths, the can-cooling machinery, and the tilting or upsetting devices for throwing the cans from a horizontal position to a vertical position as conveyed from the solder-bath to the cooling machinery; and Fig. 6 is a vertical cross-sectional view taken on line $x\ x$, Fig. 5.

In the drawings, the letter A indicates the frame within which the solder-bath is held, and A' the conveyer-chain for rotating the end of the can within the bath, said chain working over pulley-wheel $A^2$, all of which parts are of the usual construction.

The soldering-machine, composed of the frame and conveyer-belt above mentioned, indicated by the present drawings, refers to what is known as a "float soldering-machine."

Between the cooling device and the solder-bath is located the frame B, the top having bearing-boxes $a$ secured thereto. Within these boxes work the shafts C C', to which are secured the belt-wheels $C^2 C^3$, over which work the endless belt D, which is preferably made round and of rubber. Motion is imparted to shaft C by means of the pulley-wheel D', which is operated by a belt, (not shown,) and the rotation of said shaft is transmitted to shaft C' by the endless belt D.

The endless belt for carrying the cans exposed to the air-blast in order to solidify the solder is represented by the letter E, which belt works over the belt-wheels $E' E^2$, motion being imparted to the wheel E' by means of the pulley-wheel $E^4$, which is secured upon shaft $E^5$, as shown.

As the soldered cans are carried along by the travel of the endless belt E, the same are subjected to a blast of air discharged directly thereagainst from the branch pipes F, which project from the air-pipe F'. The branch pipes F project at an angle to the air-pipe at a down incline. Consequently the air ejected therefrom strikes against the lower edge of the can-body, so as to cool the freshly-applied solder.

It will be noticed by reference to Fig. 1 that the cans leave the solder-bath in a horizontal position and are placed upon the conveyer-belt of the cooler in a vertical position, being thus transposed.

The upsetting or turning of the can from a horizontal to a vertical position is accomplished by the means of the rods 1, 2, 3, 4, and 5, which rods are secured to and supported by brackets H, H', and $H^2$, the former of which is attached to the frame of the solder-bath, while the latter project from the side of frame B, as shown. The rods 2 and 3 are run from bracket H to bracket H' parallel, and for this distance serve as a trackway for conveying the can M from the solder-bath machine to the endless belt D, which belt at this point bears upon the can and causes the same to rotate and travel toward the conveyer-belt of the cooling-machine. From the bracket H' the rod 2 gradually curves or inclines upwardly until the top of arm $h^2$ of bracket $H^2$ is reached, to which it is bolted, and thence it is run in a straight line, as shown. The rod 3 crosses from bracket H' toward the rod 2, and at the same time gradually curves or inclines upwardly, as shown, following the incline of rod 2, but below the same until arm $h^2$ of bracket $H^2$ is reached, to which it is fastened, and from this point it runs in a straight line, parallel with rod 2, but a short distance below. (See Fig. 1.) The can when rolling over the rods 2 3 is prevented from moving endwise by the rods 1 4, which are secured to the arms $h$ $h'$ of bracket H and project therefrom, as shown. The rod 1 runs at a downward incline toward the arm $h^3$ of bracket H', to which it is bolted, and thence in a straight line until arm $h^2$ is reached, where the rod terminates. This rod is inclined in order to correspond with the downward pitch of rods 2 and 3. Rod 4 is attached to arm $h$ of bracket H, and runs a short distance in advance of bracket $H^2$, to which it is fastened. However, it runs at a downwardly incline, and from bracket H' curves gradually toward arm $h^2$ of bracket $H^2$, the outward curve being similar to that given rod 3, but not quite so great. Back of these four rods is located and runs the rod 5, the forward end of which is secured to bracket H', as shown, and as said rod runs toward the conveyer-belt of the cooling-machine the same is gradually curved outward toward the arm $h^2$ until bracket $H^2$ is reached, from which point it extends in a straight line, falling under belt-wheel $C^3$, and running parallel with rods 2 and 3, as shown.

As the can leaves the solder-bath, in a horizontal position, it rolls upon the rods 2 3, between the rods 1 4, downward until caught and carried along by the endless traveling belt D. As it moves under the belt-wheel $C^2$ it begins to tilt, owing to the upwardly incline and curve of rod 3 and incline of rod 2, as shown by the position of cam M', and continues to be thrown at a greater angle of inclination as it is carried toward the conveyer-belt of the cooling-machine.

When the can has reached the position shown by $M^2$, it is held between rods 1, 3, and 4 and lower position of the belt, it being rotated along by said endless belt. As it is carried nearer the conveying-belt it is thrown at a greater angle until it is finally set or placed upon the conveyer-belt in a vertical position. This belt carries the can through the blast of air previously described.

As the can is conveyed toward the discharge chute or runway N, designed to carry the can to the can-testing or other machinery, as a solder-bath for soldering the other end of the can-body, it is necessary that the can be thrown or turned from a vertical to a horizontal position in order to roll within the inclined chute or runway N. In order to accomplish this turning or upsetting of the can, the runway N is placed slightly in advance or to one side of the conveyer-belt E, (see Fig. 4,) and from the bracket $e$ runs the bar N', which is secured to the bracket $N^2$, as shown. The runway N being placed in advance of the conveyer-belt, it is necessary that the bar or plate N' be run at an angle in order that it may serve to gradually force the can from the side of the conveyer-belt to the discharge-chute and to throw the can from a vertical to a horizontal position. The can, however, if permitted to be suddenly thrown from a vertical to a horizontal position, is liable to be considerably jarred. Consequently, in order to provide against possible damage incident to such jarring, I provide an inclined rod $N^3$, which receives the can as tilted and gradually lowers the same to a horizontal position.

From the guide-piece $e'$ of the conveyer-belt frame extends the rod $N^3$, which is curved upwardly for a short distance and then runs parallel with plate $N'$, but at a gradual downward incline until the free end thereof comes into contact with platform O, slightly in front of bracket $N^2$, to which it is secured. The can being carried against the plate $N'$ by the conveyer-belt is gradually tilted over until the upper portion bears upon the inclined rod $N^3$, which, gradually inclining downward toward the discharge-chute, permits of the can being tilted at a greater angle until it finally assumes a horizontal position. As the can assumes a horizontal position the plate $N'$ serves to force the same in line with the runway or discharge-chute.

In the drawings I have only shown mechanism located between one solder-bath and cooling-machine for tilting or turning the can-body, but it will be understood that a device for turning the can-body after leaving the second solder-bath, if such be employed, so as to deliver the same to the second air-blast in a vertical position, is made use of. In other words, where both ends or heads are to be soldered to the body the mechanism herein shown and described is duplicated.

The object of rotating the can during the operation of tilting is to prevent the dragging or slipping of the can, which, if permitted, causes the displacement of the fresh solder and the formation of a weak joint.

Having thus described my invention, what I claim as new, and desire to secure protection in by Letters Patent, is—

1. The combination with the can-soldering apparatus, of a device for receiving the cans from said apparatus in an approximately horizontal position and gradually turning or tilting the same into a vertical position, the endless belt for imparting motion to the cans and assisting in the tilting thereof and the conveyer for receiving the cans when thrown into a vertical position and carrying the same exposed to an air-blast in order to solidify the solder while the can is in a vertical position.

2. In a device for receiving cans from the soldering apparatus, in an approximately horizontal position and delivering the same to the cooling apparatus in a vertical position, the combination with a series of rods or straps for gradually altering the position or inclination of the can, of an endless belt for imparting motion to the can, and assisting in the tilting thereof and conveying the same to the cooling apparatus and of suitable mechanism for imparting motion to said endless belt.

3. The combination with a can-cooling apparatus, of the discharge-chute for the cans and a device for receiving the cans from the cooling apparatus in a vertical position, so as to enter the discharge-chute in a horizontal position, said device consisting of a deflecting bar run at an angle to the cooling apparatus and discharge-chute, and an inclined rod against which the can impinges and is gradually lowered to a horizontal position.

4. In combination the solder-bath apparatus, the cooling-machine, devices for receiving the cans from the soldering apparatus in an approximately horizontal position, tilting or turning the can and delivering the same to the cooling-machine in a vertical position and imparting rotary motion to the can while being tilted and during its travel to the said cooling-machine so as to prevent dragging or slipping of the can, a discharge-chute for the cooling-machine, and a device located between the cooling-machine and discharge-chute, which receives the cans in a vertical position, tilts or turns and delivers the same to the discharge-chute in a horizontal position.

In testimony whereof I affix my signature in presence of two witnesses.

HENRY SCHAAKE.

Witnesses:
J. G. LAWS,
W. A. ACKER.